United States Patent Office 3,576,588
Patented Apr. 27, 1971

3,576,588
PROCESS FOR DYEING SYNTHETIC FIBERS AND BLENDS IN DYE BATHS CONTAINING AMMONIUM THIOCYANATE AND AMMONIUM CITRATE
John C. Willson, Bloomfield, N.J., assignor to Allied Chemical Corporation, New York, N.Y.
No Drawing. Filed Sept. 13, 1967, Ser. No. 668,297
Int. Cl. D06p 3/82
U.S. Cl. 8—21
13 Claims

ABSTRACT OF THE DISCLOSURE

Improved coloring compositions, especially printing pastes, comprising at least one basic or disperse organic dyestuff together with a mixture of ammonium thiocyanate and at least an equal weight of ammonium citrate, said ammonium thiocyanate amounting to at least about 0.5% by weight of the coloring composition are provided. The improved compositions, when applied to natural and syntheic fibrous materials, provide a high fixation efficiency of the dyestuff with authentic dye shade.

---

Printing pastes have been utilized for many years for the localized coloration of textile materials. The usual printing paste comprises a dye or pigment as the colorant, a thickening agent, and optional auxiliaries such as resins to bind the pigments to the fiber, oxidizing or reducing chemicals, solubilizing agents, in the case of dyes, and the like.

Such pastes are conventionally applied by means of an intaglio engraved or relief roller, by a screen having certain predesigned areas blocked off, e.g. "silk screen printing," tray dipping, and the like. Such methods are discussed in "Principles and Practice of Textile Printing" by E. Knecht and J. P. Fathergill, 4th ed. (1952) and "Silk Screen Printing Process" by Biegeleisen and Busenbark. Usually the printing paste thus applied is subjected to a steam treatment to fix the dyestuff on the fibers. This treatment may involve contact with superheated steam at temperatures of about 95° C. to 140° C. or higher, for periods of, e.g. 2 to 90 minutes.

With the demand for greater production capacity and the advent of high speed printing machinery, known conventional printing pastes are not entirely satisfactory due to a lesser fixation efficiency of the dye colorant which generally characterizes these pastes.

It is thus a principal object of this invention to provide coloring compositions capable of improved dye fixation on materials comprising synthetic and natural fibers.

A more specific object is to provide dye printing pastes which, when applied to textile materials comprising nitrogenous, synthetic and natural fibers such as polyacrylonitrile, polyamide, silk and wool, are capable of being rapidly fixed to such materials.

Another object of this invention is to devise methods whereby the novel printing pastes are advantageously employed in the printing of textile materials comprising nitrogenous fibers in both the synthetic and/or natural fibers classification.

According to my invention, there is employed for the coloring of materials comprising synthetic and natural fibers, especially nitrogenous fibers, a composition containing, as colorant, one or more basic and/or disperse dyes, and as a fixation promoter, ammonium thiocyanate together with ammonium citrate, the latter salt being present in an amount by weight which is at least equal to the former.

The compositions of my invention are applicable to all types of cellulose ester and polyacrylic materials containing fibers composed entirely or largely of cellulose esters, e.g. cellulose acetate and cellulose triacetate, or especially, polyacrylonitrile. Such materials may be in the form of filaments, yarns, woven cloth, knitted materials carpeting, or any other form on which it might be desired to conduct a coloring operation.

The compositions are also applicable to yarns, cloth, carpeting, or the like prepared from mixtures of polyacrylic fibers and other textile fibers, such as wool, nylon, silk, and cellulose ester fibers. (Bonded fabrics wherein two or more materials are laminated one to the other, are included also within the terms "textile material comprising polyacrylonitrile" and polyacrylic textile material," as employed in this specification and the claims appended thereto.) Polyacrylic fibers and blends thereof with other textile fibers are produced by a number of manufacturers and marketed under numerous trade names as illustrated by "Acrylan" and "Orlon."

In the preparation of coloring compositions such as printing pastes, the dyestuff used is one adapted for the particular textile material being treated. As will be obvious to those skilled in this art, polyacrylic textile materials can be dyed by basic dyestuffs. Textile materials comprising cellulose esters can be dyed with disperse dyes, i.e. those water insoluble dyes which are introduced in the form of a dispersion or colloidal suspension and absorbed by the fibers.

Illustrative of the dyes which can be used in the novel compositions of the present invention are the following commercial dyes with their Color Index designation or chemical composition in parenthesis:

BASIC DYES

| | |
|---|---|
| Nabor Blue 2G | (CI Basic Blue 22). |
| Nabor Blue FG | (CI Basic Blue 51). |
| Nabor Brill. Pink 2B | (CI No. 48015). |
| Nabor Brill. Red 6B | (CI No. 48020). |
| Nabor Orange G | (CI No. 48035). |
| Nabor Orange R | (CI No. 48040). |
| Nabor Yellow 4G | (CI No. 98055). |
| Nabor Yellow 6G | (CI Basic Yellow 13). |
| Nabor Violet 3R | (The violet dyestuff N 4 amino - 3 - methyl - 1 - anthraquinoyl amino trimethylenetrimethyl - ammmonium methyl sulfate). |

DISPERSE DYES

| | |
|---|---|
| Nacelan Blue FFRN | (CI No. 61505). |
| Nacelan Fast Yellow CG | (CI No. 11855). |
| Nacelan Rubine KB | (CI No. 11215). |
| Nacelan Scarlet CSB | (CI No. 11110). |
| Nacelan Violet 4B | (CI No. 61105). |
| Nacelan Violet 5RL | (CI No. 61100). |
| Nacelan Brilliant Orange 3R | (The monoazo dyestuff from diazotized p-nitroaniline coupled into N-(hydroxyethyl) - o - ethylaniline). |

Mixtures of the dyestuffs and equivalent compositions of the classes illustrated above are contemplated also.

When coloring textile materials containing a blend of nitrogenous synthetic and natural fibers such as polyacrylonitrile, polyamide, silk and wool and/or cellulose ester fibers, dyestuffs known to have affinity for these fibers and which are compatible chemically with each other may also be included in the novel printing pastes. For example, when printing upon a blend of polyacrylic fibers and cellulose acetate fibers, the paste may contain one or more basic dyestuffs for the polyacrylic fibers and one or more disperse dyestuffs for the cellulose acetate fibers.

The quantity of dyestuff used in the compositions can be varied over a broad range depending upon the depth of shade desired. Thus, deep shades may require up to 10% or more of the dyestuff. Whereas pastel shades may be obtained with only 0.1% or less of the dyestuffs.

The improvements obtained in accordance with the present invention follow from the inclusion in the dye composition of ammonium thiocyanate and ammonium citrate.

Although it was known to include ammonium thiocyanate in printing pastes, the combination of this known component with ammonium citrate is new and provides improvements over the use of ammonium thiocyanate alone. The precise mode of action of this new combination of ammonium salts is not known. Ammonium thiocyanate, it is known, functions as a metallic mordant and lakes with the basic colors to form an extremely insoluble lake during the steaming step. It is believed that the ammonium citrate functions to dampen or retard the lake formation and thus to control the colloidal size of the laked formation and thus to control the colloidal size of the laked particles of the dyestuff. In this manner agglomeration of the lake may be prevented and the ability of the colorant to penetrate the interstices of the fiber is enhanced. Some indication of the correctness of this theoretical explanation is given by the observation that pastes prepared in accordance with this invention retain their fine colloidal character and stability, on standing for several hours.

The proportions of the two salts used may be varied over a considerable range. At least about an equal amount by dry weight of the two salts is used. Preferably from about 2 parts (by dry weights) of ammonium citrate per part of ammonium thiocyanate is used, and especially from about 2 to about 5 parts of ammonium citrate per part of ammonium thiocyanate is provided.

The amount of the salts can be varied, depending upon such factors as rapidity of fixation desired, the particular dyestuff or dyestuffs and the like. Generally the optimum result will be obtained when the combined amount of the ammonium salts used is within the range of about 2.5 to about 8% of the total weight of the composition. At least about 0.5% ammonium thiocyanate should be present, while more than about 5% by weight of the composition may cause unstability, depending on the particular dyestuff employed.

In addition to the materials already discussed, the coloring compositions of the present invention can contain the conventional components such as thickeners, printing assistants, acids, dispersing and solubilizing agents and water, the use of which is within the skill of the art.

Printing assistants, such as fixing agents, which function to improve the transfer of the colorant from the printing paste onto and into the synthetic or natural fiber are conventionally used as components of the printing pastes. The exact mechanics of the so-called "fixing" process are not fully understood, but it is believed that the fixing agent exerts a swelling action on the synthetic fiber and in this manner enables the colorant to more rapidly and effectively penetrate the structure of the synthetic fiber. Such agents as phenol, benzoic acid, β-naphthonitrate, phenyl salicylate, o-cyclohexyl phenol, ethylene glycol monophenyl ether and the like are commonly used and are contemplated herein. Of particular interest in the printing of polyacrylic textile materials in accordance with the present invention, is the product Solvocine PFD which has been characterized as an organic material containing nitrile groups, which functions as a fixing agent in other conventional applications.

Weak organic acids, such as carboxylic, illustrated by acetic acid, formic acid and propionic acid can be included to control the pH, particularly in the case of basic dyes where a neutral or acid pH is desirable. About 1% to about 6% by weight acid by weight of the final composition is usually sufficient.

The method of preparing the compositions of the present invention can vary. Usually the ammonium salts are added after the colorants and other components have already been mixed together. The ammonium salts are conveniently added in aqueous solution of sufficient concentration to assure good mixing, preferably about 50 to 60%. While the two salts can be added separately, it is preferred to prepare a single solution containing both salts in the aforementioned proportions and add at least about 4% and preferably about 7 to 15% by weight of the final coloring composition. In addition to the convenience of having a single solution ready to use as needed, this method provides easier pH control and more consistent results.

A typical dye printing paste formulation preparation in accordance with this invention would have the following composition:

| | Percent by wt. |
|---|---|
| Basic dye(s) | 4 |
| Fixing agent | 5 |
| Glacial acetic acid | 5 |
| Aqueous solution of (ammonium citrate and ammonium thiocyanate) | 12 |
| Thickener | 74 |
| Water | |
| Total | 100 |

Of course this typical formulation can be altered depending on the conditions of its use. Thus for light shades only about ¼% of dyestuff would be needed. Other factors influencing the formulation would be choice and amount of thickener used, amount and relative proportions of the ammonium salts used, characteristics of the individual basic dyes used, complexity of the printed design, and the processing techniques dictated by the process machinery and fabric end use. The considerations are typical of all printing paste formulations and those skilled in this art will have no difficulty in adjusting the relative proportions of each of the ingredients of this paste, especially in view of the above information.

The novel dye printing pastes are of particular value in at least three distinct fields of the textile printing art.

Firstly, the dye printing pastes can be applied to polyacrylic textile materials and in blends with polyamide fibers in the space printing of carpet denier yarns on both knit-deknit and warp printing methods, applied by intaglio engraving, screen and surface roller methods. The printed, undried material is steamed in a conventional manner at 217° to 220° F., at atmospheric pressure for periods ranging from 15 seconds to 5 minutes depending upon the printing and aging equipment, and the end use of the material. The knit-deknit process is more fully described by Charles Pfizenimaeir in the American Dyestuff Reporter Mar. 27, 1967 (pp. 43–45).

Secondly, the dye printing pastes can also be used to print carpets of acrylic yarns tufted into carpets and rugs, applied by screen, surface roller and tray dip methods. The printed undried, material is steamed in a conventional manner for periods of from 1 to 10 minutes depending upon the depth of print shade and the printing and aging equipment used.

Thirdly, flat woven and circular knit, e.g. apparel constructions, comprising polyacrylonitrile, polyamide, silk, wool and cellulose ester fibers, can be printed by conventional screen and roller methods. Adequate fixation with good definition and smooth appearance is obtained when the dried prints are steamed at 217° to 220° F. at atmospheric pressure, from three to ten minutes. Five and ten minute steaming results compare favorably in color yield with prints steamed under pressure in an autoclave, or cottage steamer, for periods of one hour and longer.

The novel dye printing pastes of the present invention produce prints, which, when compared to those derived from known printing pastes, exhibit higher dye print fixation efficiency as evidenced by dye print shades which:

(1) Are deeper when the same dye, and the same dye concentration are printed on the same material and are steamed and washed under identical conditions, especially when the steaming time is in the range of 15 seconds to ten minutes or longer.

(2) Fix more rapidly under conditions defined in (1) above, especially when the steaming time is in the range of 15 seconds to 3 minutes, where the depth of shade versus that of conventional pastes is from approximately 25 % to 50% deeper.

(3) As a result of (1) and (2) above, largely circumvent erratic print shade variations in dye mixtures where conventional pastes characteristically have a lower dye fixation efficiency, e.g. in a 3 color mixture such as used in browns or tans, incomplete fixation of one or more dyes, especially in shorter steaming times, results in extremely troublesome shade matching problems.

(4) Are closely authentic to the hue and color cast of the dyed shade of the same dyestuff, unlike some conventional print pastes which contain metallic or other fixing agents that alter and distort markedly the *printed* shade as compared to the equivalent *dyed* shade.

(5) Have better wet fastness, especially in the shorter steaming times; when compared to results of conventional print pastes.

(6) Produce union shades on many textile materials comprising blends of fibers not usually dyeable by many conventional print pastes. This advantage is explained by considerations set forth in (1) and (2) above and attributed to my novel combination of ammonium salts.

The novel print pastes of the present invention by virtue of improved dye fixation produce prints, which when compared to conventional print pastes, show an attractive economic advantage achieved by:

(a) reduced steaming time to obtain a given shade.
(b) use of high production continuous steaming equipment and eliminating pressure steaming, i.e., cottage steaming, which is a relatively expensive batch-type operation.

While the invention has been discussed with greater particularity in respect to the preferred embodiment, printing pastes, it is also applicable to "pad-steam dyeing" wherein the compositions may be in the form of a paste or a liquor, depending on the amount of thickener employed.

The technique of "pad-steam dyeing" is a well known technique of application of various classes of dyestuffs to textile materials. In this method, the textile material is impregnated with an aqueous paste or liquor containing the dyestuff and the dryeing auxiliaries, and thereafter the impregnated material may be passed through a series of rollers to remove excess dye paste or liquor. The material may be dried or it may be subjected to heat in the form of steam, for example at about 217° to 220° F., the particular procedure being dependent upon the end use of the dyed or printed product and the equipment used. Further details of the procedure and of the equipment used in the "pad-steam" method can be found in the standard reference books on dyeing and printing, e.g., "Whittaker's Dyeing with Coal Tar Dyestuffs" Sixth Edition by C. C. Wilcock and J. L. Ashworth, 1964 D. Van Nostrand Company, Inc.

Irrespective of whether a padding liquor or printing paste is used, the same excellent fixation efficiency of the dyestuff colorant, with authentic dye shade, is obtained, which features are characteristic of my improved coloring compositions.

The following examples will illustrate the present invention. Parts and percentages are by weight. In these examples, Solution A is an aqueous solution containing 333 parts of ammonium citrate and 167 parts of ammonium thiocyanate per 1000 parts solution, and Solution B is an aqueous solution containing 333 parts ammonium citrate and 67 parts ammonium thiocyanate per 1000 parts solution. The solutions were prepared by forming a solution of ammonium citrate in water, adding an excess of ammonia, as ammonium hydroxide, to provide an alkaline pH and then adding the ammonium thiocyanate.

EXAMPLE 1

A knitted fabric of polyacrylonitrile continuous filament carpet yarn (Creslan 68) was space printed with a paste of the following composition:

| | Parts |
|---|---|
| C. I. Basic Blue 22 | 27 |
| C. I. 48040 | 5.5 |
| Dowanol EP (ethylene glycol monophenyl ether) | 10 |
| Glacial acetic acid | 50 |
| Water | 352.5 |
| 1.5% Kelzan (a polysaccharide thickening agent) | 435 |
| Solution A | 120 |
| | 1000.0 |

After printing the undried print was steamed for 30 seconds at 217° F., and atmospheric pressure, rinsed in warm water, soaped at 160° F. and rinsed in warm, then cold water. After drying, a print of dark brown shade with good penetration was obtained.

EXAMPLE 2

A knitted fabric of polyacronitrile continuous filament carpet yarn (Creslan 68) was pad-steam dyed with a pad liquor of the following composition:

| | Parts |
|---|---|
| C. I. Basic Blue 22 | 0.90 |
| C. I. 48035 | 0.70 |
| C. I. 48040 | 0.23 |
| Dowanol EP (ethylene glycol monophenyl ether) | 10 |
| Glacial acetic acid | 50 |
| Water | 428 |
| 0.7% Kelzan | 435 |
| Solution A | 75 |
| | 1000.00 |

The padded fabric, undried, was steamed for 30 seconds at 217° F. and atmospheric pressure, rinsed in warm water, soaped at 160° F. and rinsed in warm then cold water. After drying the yarn was colored a medium light olive with good penetration.

EXAMPLE 3

A carpet material of polyacrylonitrile loop pile continuous filament carpet yarn was printed with a paste of the following composition:

| | Parts |
|---|---|
| C. I. 48015 | 10 |
| Glacial acetic acid | 40 |
| Solvocine PFD (a fixing agent consisting essentially of an organic material containing nitrile groups) | 50 |
| Water | 480 |
| 5% Polygum 260 (a modified locust bean thickening agent) | 300 |
| Solution B | 120 |
| | 1000 |

After printing the undried print was steamed for 3 minutes at 217° F. and atmospheric pressure rinsed in warm water, soaped at 160° F. and rinsed in warm, then cold water. After drying a deep shade of bluish red was obtained which has excellent wet fastness properties.

EXAMPLE 4

A carpet material of polyacrylonitrile loop pile continuous filament carpet yarn was printed with a paste of the following composition:

| | Parts |
|---|---|
| C. I. 98055 | 10 |
| Glacial acetic acid | 40 |
| Solvocine PFD | 50 |
| Water | 480 |
| 15% Kelzan | 300 |
| Solution A | 120 |
| | 1000 |

After printing, the undried print was steamed for 3 minutes at 217° F. and atmospheric pressure, rinsed in warm water, soaped at 160° F. and rinsed in warm, then cold water. After drying a deep shade of golden yellow was obtained which has excellent wet fastness properties.

EXAMPLE 5

A challis fabric of polyacrylonitrile fiber (Acrilan 16) was screen printed with a print paste of the following composition:

| | Parts |
|---|---|
| Nabor Brilliant Red 6B | 10 |
| Glacial acetic acid | 40 |
| Solvocine PFD | 50 |
| 5% Polygum 260 | 450 |
| Water | 330 |
| Solution B | 120 |
| | 1000 |

After printing, the dried printed fabric was steamed for 35 seconds at 217° F. and atmospheric pressure, rinsed in warm water, soaped at 160° F. and rinsed in warm, then cold water. After drying a bright fuchsia print with good penetration was obtained.

EXAMPLE 6

An acetate jersey fabric of cellulose acetate was roller printed with a print paste of the following composition:

| | Parts |
|---|---|
| The violet dyestuff, N-4-amino-3-methyl-1-anthraquinonylamino - trimethylene - trimethyl - ammonium methyl sulfate | 20 |
| Glacial acetic acid | 40 |
| Solvocine PFD | 50 |
| Water | 290 |
| 5% Polygum 260 | 450 |
| Solution B | 150 |
| | 1000 |

After printing a portion of the dried printed fabric was steamed for 3 minutes, a second portion was steamed for 10 minutes, and a third portion was steamed in a cottage steamer at 7 lbs. superatmospheric pressure for 90 minutes. Three minute and 10 minute steamings above were at 217° F. and atmospheric pressure. The prints were rinsed in warm water, soaped at 160° F. and rinsed in warm, then cold water. After drying a full rich bluish red shade was obtained on all three samples with comparable color value.

EXAMPLE 7

An acetate jersey fabric of cellulose acetate was screen printed with a print paste of the following composition:

| | Parts |
|---|---|
| Nabor Grange R | 10 |
| Glacial acetic acid | 40 |
| Solvocine PFD | 50 |
| Water | 300 |
| 5% Polygum 260 | 450 |
| Solution A | 150 |
| | 1000 |

After printing, a portion of the dried printed fabric was steamed for 3 minutes, a second portion was steamed for 10 minutes, and a third portion was steamed in a cottage steamer at 7 lbs. superatmospheric pressure for 90 minutes. Three minute and 10 minute steamings above were at 217° F., and atmospheric pressure. The prints were rinsed in warm water, soaped at 160° F. and rinsed in warm, then cold water. After drying a bright deep shade or orange was obtained with comparable color value on all three samples.

EXAMPLE 8

A challis fabric of cellulose triacetate fiber (Arnel) was screen printed with a print paste of the following composition:

| | Parts |
|---|---|
| C. I. Basic Yellow 13 | 10 |
| Glacial acetic acid | 40 |
| Solvocine PFD | 50 |
| Water | 300 |
| 5% Polygum 260 | 450 |
| Solution A | 150 |
| | 1000 |

After printing, the dried printed fabric was steamed 10 minutes at 217° F. and atmospheric pressure, rinsed in warm water, soaped at 160° F., and rinsed in warm, then cold water. After drying a bright full shade of Lemon Yellow was obtained with good penetration and sharp definition. The color value of this print compared to results of the same color paste on Acrilan 16 challis printed, steamed and washed at the same time showed equivalent value.

EXAMPLLE 9

A knitted fabric of polyacrylonitrile continuous filament carpet yarn (Creslan 68) was space printed with a paste of the following composition:

| | Parts |
|---|---|
| C. I. Basic Blue 22 | 1.40 |
| C. I. 48040 | 3.00 |
| The violet dyestuff N - 4 - amino - 3 - methyl - 1 - anthraquinonylamino - trimethylene - trimethyl-ammonium methyl sulfate | 0.10 |
| Glacial acetic acid | 50.00 |
| Solvocine PFD | 50.00 |
| Water | 450.00 |
| 2% Kelzan | 300.00 |
| Solution A | 150.00 |
| | 1000.00 |

After printing a portion of the undried print was steamed for 35 second at 217° F. and atmospheric pressure; a second portion of the undried print was steamed for 60 seconds at 217° F. and atmospheric pressure. Both steamed portions were rinsed in warm water, soaped at 160° F. and rinsed in warm, then cold water. After drying a satisfactory shade of rust was obtained on both portions and the 35 second steaming was practically as deep as the 60 second steaming.

EXAMPLE 10

A knitted fabric of 70% polyacrylonitrile continuous filament carpet yarn and 30% polyamide continuous filament carpet yarn was space printed with a paste of the following composition to produce a union shade with good fastness:

| | Parts |
|---|---|
| C. I. Basic Blue 22 | 17.50 |
| Nacelan Blue FFRN | 15.00 |
| Glacial acetic acid | 60.00 |
| Thiodiethylene glycol | 20.00 |
| Dowanol EP (ethylene glycol monophenyl ether) | 10.00 |
| Water | 510.00 |
| 5% Polygum 260 | 250.00 |
| Solution A | 150.00 |
| | 1000.00 |

After printing, the undried print was steamed for 3 minutes at 217° F.–220° F. and atmospheric pressure, rinsed in warm water, soaped at 140° F. and rinsed in warm, then cold water. After drying a deep shade of royal blue with good penetration and a solid blue shade on both fibers was obtained. It was noted that the disperse dye as printed with this print paste had adequate wash fastness at 140° F.

This invention has been particularly disclosed with respect to certain preferred embodiments. Various modifications and variations thereof will become obvious to persons skilled in the art. It is to be understood that such modifications and variations are to be included within the scope of the present invention. For example, while steaming temperatures of 217°–220° F. have been disclosed, the use of superheated steam at higher temperatures is not precluded.

I claim:

1. A process for dyeing and printing synthetic fibers and blends of nitrogenous natural and synthetic fibers which comprises treating said fibers with a composition comprising a dyestuff selected from the group consisting of basic dyes, disperse dyes and mixtures thereof, from about 2.5 to 8%, by weight, based on the weight of said composition, of a mixture of ammonium thiocyanate and ammonium citrate, the amount of said ammonium citrate being at least equal, by weight, to the amount of said ammonium thiocyanate, and steaming the thus treated fibers.

2. The process of claim 1 wherein the amount of ammonium citrate is at least twice the amount of ammonium thiocyanate.

3. The process of claim 2 wherein the amount of ammonium citrate is 2 to 5 times the amount of ammonium thiocyanate.

4. The process of claim 1 wherein the amount of ammonium thiocyanate is at least about 0.5% by weight of the composition.

5. The process of claim 1 wherein the dyestuff is a basic dye.

6. The process of claim 1 wherein the composition is printed on the fibers.

7. The process of claim 1 wherein the fibers are polyacrylonitrile.

8. A process for printing polyacrylonitrile fibers which comprises applying to said material a composition consisting essentially of a basic dyestuff, a thickener, a fixing agent, a weak acid, water, ammonium thiocyanate and ammonium citrate, said ammonium citrate being present in an amount about 2 to 5 times the amount of ammonium thiocyanate and the total amount of said ammonium salts being about 2.5 to 8% by weight of said composition, and steaming the thus treated fibers.

9. A coloring composition comprising a dyestuff selected from the group consisting of basic dyes, disperse dyes and mixtures thereof, and an amount of ammonium thiocyanate and an amount of ammonium citrate such that the latter amount is at least equal, by weight, to the former amount and wherein the combined amount of said ammonium thiocyanate and said ammonium citrate is about 2.5 to 8%, by weight, of said composition.

10. The coloring composition of claim 9 wherein the dyestuff is a basic dye.

11. The coloring composition of claim 9 wherein the ratio of ammonium citrate to ammonium thiocyanate about 2:1 to 5:1, and the amount of ammonium thiocyanate is at least about 0.5% by weight of said composition.

12. The coloring composition of claim 9 which also contains a weak acid, water, a fixing agent and sufficient thickener to form a paste.

13. Polyacrylonitrile colored with the composition of claim 10.

References Cited

UNITED STATES PATENTS

| 2,514,410 | 7/1950 | Olpin et al. | 8—172X |
| 2,955,010 | 10/1960 | Fluegel et al. | 8—62 |
| 3,117,831 | 1/1964 | Mautner | 8—177AB |

GEORGE F. LESMES, Primary Examiner

T. J. HERBERT, Jr., Assistant Examiner

U.S. Cl. X.R.

8—62, 172, 177